United States Patent

Kaaden et al.

[11] Patent Number: 6,078,449
[45] Date of Patent: Jun. 20, 2000

[54] METHOD FOR THE CONTROL OF TRACK FOLLOWING IN A RECORDER

[75] Inventors: Jürgen Kaaden, Villingen-Schwenningen, Germany; Christof Stumpf, Meylan, France; Edgar Wursthorn, Bad Dürrheim, Germany

[73] Assignee: Deutsche Thomson-Brandt GmbH, Villingen-Schwenningen, Germany

[21] Appl. No.: 08/848,119

[22] Filed: Apr. 28, 1997

Related U.S. Application Data

[63] Continuation of application No. 08/083,774, Jun. 30, 1993, abandoned.

[30] Foreign Application Priority Data

Jul. 4, 1992 [DE] Germany .............................. 42 22 030

[51] Int. Cl.[7] ...................................................... G11B 5/09
[52] U.S. Cl. .......................... 360/51; 360/48; 360/77.12; 360/40
[58] Field of Search ................................. 360/10.2, 14.2, 360/73.08, 77.15, 77.12, 51, 48, 46, 40

[56] References Cited

U.S. PATENT DOCUMENTS 5,065,413 11/1991 Fukuda ....................................... 360/51
5,245,483 9/1993 Van Gestal ................................ 360/48

OTHER PUBLICATIONS

Pohlmann, Ken C. "Principles of Digital Audio" 2 Ed. pp. 273–278 1992.
IEEE Transations on Consumer Electronics, vol. 34 No. 3 Aug. '88, "An Experimental Digital VCR With 40 MM Drum, Single Actuator and DCT–Based Bit–Rate Reduction".
IEEE Transactions On Magnetics, vol. 24 No. 2, Mar. 1988 Kees A. Schouhamer "Sighal–to–noise Ratio Pilot Tracking Tones Embedded in Binary Coded Signals" pp. 2004–2009.
IBM Technical Disclosure Bulletin vol. 33 No. 3B Aug. 1990 "Quad Burst Servo Needing No Sync and Having Added Information" pp. 198–200.
Patents Abstracts of Japan P–1090 Aug. 9, 1990 vol. 14, No. 369 "Digital Magnetic Recording System".

*Primary Examiner*—Andrew L. Sniezek
*Attorney, Agent, or Firm*—Joseph S. Tripoli; Frederick A. Wein

[57] ABSTRACT

A method of controlling track following in a recorder which uses recording in oblique tracks of a magnetic tape without inactive areas between the tracks and wherein data gaps occur in the useful data sequence due to the change of tracks includes the step of filling the time period containing the data gaps with a predetermined sequence of cyclical modifications of code words representing amplitude and degree increments of a symmetrical train of oscillations. A sequence of code words is used to produce incremental portions of the train of symmetrical oscillations whereby a number of incremental portions forms a complete train of symmetrical oscillations. The code words are modified in synchronism with the clock rate at which the useful data of the recorder are clocked.

5 Claims, 8 Drawing Sheets

+4+2-2-2-4-4-2+2+4

DISPARITY COURSE

+4+4+4+4+4+4+4+4

METHOD FOR THE CONTROL OF TRACK FOLLOWING IN A RECORDER

This is a continuation of application Ser. No. 083,774 filed Jun. 30, 1993, now abandoned.

BACKGROUND OF THE INVENTION

The invention is directed to a method for controlling track following in a tape recorder. When recording in the oblique tracks of tapes used with analogue and digital tape recording devices, either video or audio, it is necessary for each of the two heads to exactly find its track during the reproduction of the video or audio. To this end, for VHS, a pulse is recorded on a longitudinal track of the magnetic tape when a particular head moves into alignment with the tape. During reproduction, the pulse is evaluated and serves to control the tape/head servo regulation. Entailed by the influence of tape stretching and adjustment tolerances, a means for adjusting the pulse position by the user, so-called tracking, is provided in such types of device.

The 8 mm video system contains a so-called ATF (automatic track following) circuit with which the track maintaining information is inserted into the channel in use. During recording, a predetermined sequence of specific low frequency signals, typically one per track, is interleaved in frequency gaps existing in the useful signal spectrum. During reproduction, the head reads user information from the track, and also, as a result of the low azimuthal coupling of the low frequency signals, track maintaining information is free from the two adjacent tracks. The track following is controlled by amplitude comparison of the signals from right and left neighboring tracks.

In the DAT system (Digital Audio Tape) the digital audio signals, the useful signal, and the track following signal are recorded at separate locations, whereby a so-called "run-in" region which is used for the synchronization of the clock rate recovery, is placed in front of the useful signal and the ATF frequencies are obtained during recording by division of the signal clock rate. For the digital recording of video, especially for HDTV, the recording data rate is high and spatially separate recording of signals on the tape is hardly tenable since the amount of tape surface which is needed is then intolerably high.

The special generation of the ATF signal is described in IEEE Transactions on Consumer Electronics, August 88, page 597–605. In this technique a "run-in" region is associated with the clock rate recovery and the ATF information is formed by a cyclical variation of the DC component of the data items in the channel. The variation of a digital sum in each cycle of 10 bits permits the generation of triangular signals having various basic frequencies, each of different amplitudes, as permanent additional functions to the 8/10 channel modulation (matching the input signal to the capabilities of the recording channel).

The various know solutions have, to a greater or lesser extent, several disadvantages. In general, only triangular shaped signals can be produced which result in a large content of higher harmonics and a correspondingly high harmonic distortion factor. Generally, different frequencies have undesirably different amplitudes even during the generation. If a permanent ATF signal is also produced, balancing of priorities is necessary if two contradictory requirements are to be fulfilled. Errors in the ATF sequence can arise because the error rate of the useful signal should not rise e.g. through over stepping of the run length and the loss of synchronization associated therewith. The possibilities for channel matching are in general distinctly limited. Without the inclusion of ATF, only 256 (8 bits) are selected from 1024 possible output combinations (10 bits) in the 8/10 modulation.

These 256 bits are selected with regard to their disparity to 0 (sum of all H bits—sum of all L bits), which is not always possible, and are optimized as regards their run length so that the low and high frequency components are reduced. The unused combinations (code words) 1024–256 can be ignored. Their appearance during reproduction is an indication for the occurrence of an error. This so-called "erasure" may be used to advantage for error correction. By inclusion of the ATF, the code word range is appreciably larger, and especially advantageous code words (disparity= 0) can be used infrequently. The additional amount of circuitry is generally substantial since the digital sum value is controlled by two variable sources. The basic 8/10 conversion would give an optimized data word which would still have to be tested as to its suitability as an ATF code word (checking of the disparity and, if necessary, a search for a new code word).

The object of the invention is to develop a method of controlling track following in a recorder without the need for recording various ATF frequencies and which makes the production of an ATF signal having a smaller number of harmonics and a low harmonic distortion factor possible.

SUMMARY OF THE INVENTION

Thus with the invention, the continuous ATF production in an oblique track is replaced by one or more short term ATF burst frequencies that occur in gaps in the useful data due to changes in the track, such as run-in, run-out and edit gaps within the track. The ATF frequency bursts are recorded throughout the whole track at the same frequency. The time period containing the data gaps is filled with a predetermined sequence of cyclical modifications of a data word, or digital sum. Accordingly, a number of cycles forms a symmetrical train of oscillations and the modification of the sum is controlled in synchronism with the clock rate with which the useful data are clocked. The production of the ATF burst occurs at the clock rate of the channel modulation so that clock rate recovery synchronization during the ATF phase which occurs during reproduction of sound or audio is easily possible. For further improvement of the clock rate recovery, the ATF words are designed so that least two pulse sides in the same direction occur within a word. Also, for the purpose of synchronization of the whole system, a block synchronization pulse is provided, this pulse is not used for any other purpose in the system. The discrimination of the synchronization pulse from the other system pulses is effected by using a particular length for the synchronization pulse, for example in the present case this value is 7 consecutive pulses in the same direction. No other signal used in the system can equal this value so that a maximum length of 6 successive H or L bits is the system limit for the exemplary 7 bit system. The value may be varied for systems having other boundary conditions. Also, preferrably the length of the system data pulses is at least an order of magnitude less than that of the synchronization pulse.

The ATF bursts are approximately sinusoidal, and are formed as trains of code words consisting of high and low bits and are present in adjacent tracks. All code words have the same number of bits and frequency. However, the number of highs and lows varies from word to word. To this end, code words having different digital sums, and thus representing different voltage levels, are placed together in sequence. There thus exists a highest frequency of clock-rate/40 and 4 steps can define a triangle of low amplitude; however, the resolution can be increased by increasing the length of the sequence of code words. However, optimal matching to the transient behavior of the evaluation circuit, the azimuthal damping of the heads and the low frequency properties of the tape recording channel, only permits a usable frequency range of 200 kHz–2 MHz.

BRIEF DESCRIPTION OF THE DRAWINGS

The invention is explained with reference to the drawings in which.

DETAILED DESCRIPTION OF THE DRAWINGS

Figure 1A:
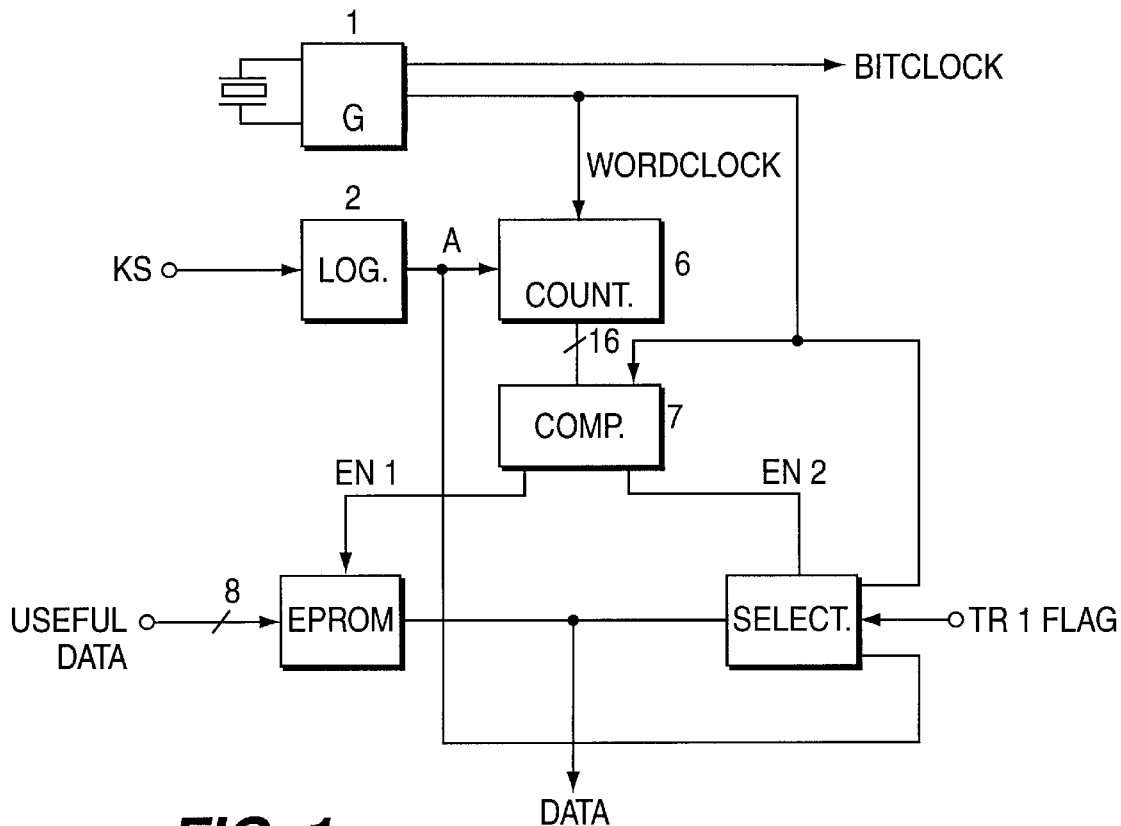
FIG. 1a is a block diagram of a circuit for practicing the inventive method.
Figure 1B:
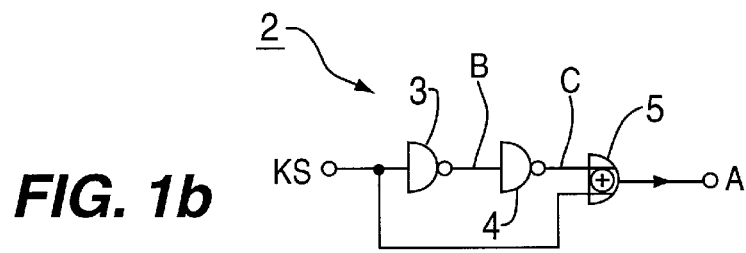
FIG. 1b shows the logic circuit 2 of FIG. 1a in detail.
Figure 2:
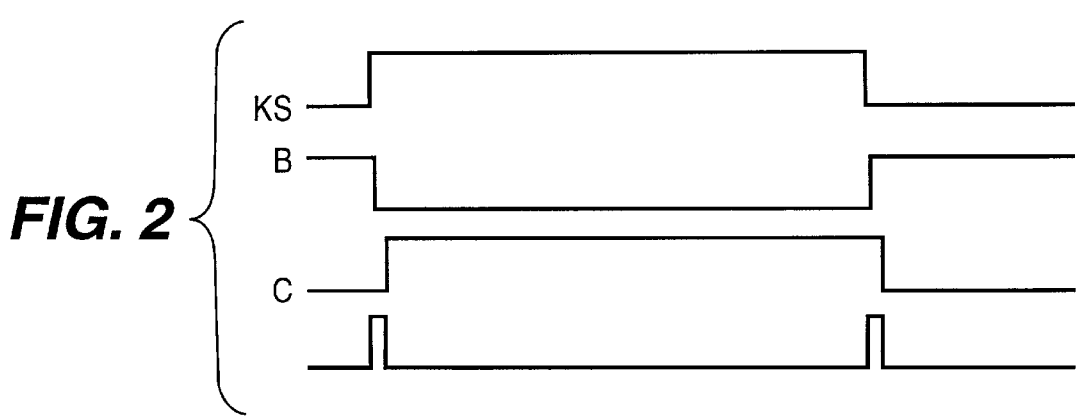
FIG. 2 shows curves which explain the circuit shown in FIG. 1.

FIG. 1 is a block diagram of a system which functions according to the inventive method. A 50 MHz signal, which represents the bit-clock, is generated in the oscillator 1. In addition, a divided-by-10 rate is made available as a 5 KMHz word-clock. An external head switching signal KS, which is provided by the head drum servo system marks the drop-on time point of a read/write head onto the tape, and thus the start of a track, by means of its side change signal. Signal KS is supplied to the function group logic 2, which is illustrated in more detail by the components 3, 4, 5 in the lower part of FIG. 1. The output signal A of logic circuit 2 is the reset signal RES for a counter 6 having a width of 16 bits i.e. 64000 possible counting states, which increments with each positive side of the word-clock.

Figure 3A:
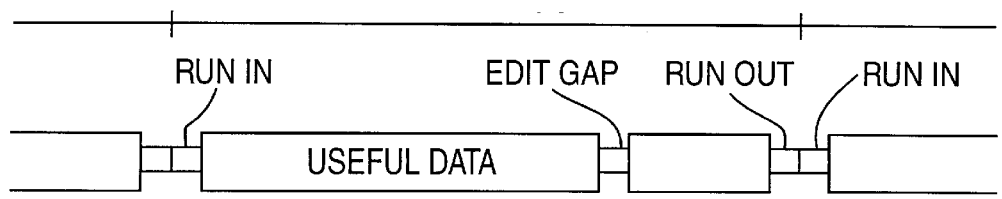
FIGS. 3a to 3g show addition curves useful in explaining the inventive method.
Figure 3B:
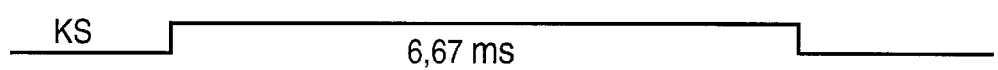
Figure 3C:
Figure 3D:
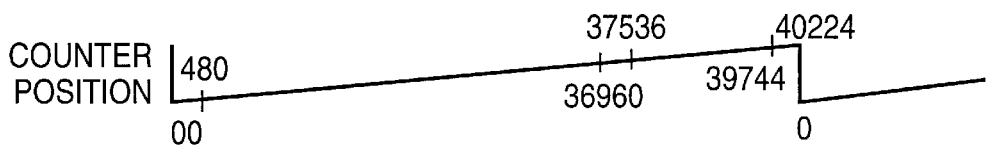
Figure 3E:
Figure 3F:
Figure 3G:

The position of the counter, which is illustrated in FIG. 3d, is compared with different fixed values in the 16 bit comparator 7 and, upon equality, switching signals are generated which are referenced as EN1 and EN2 in FIGS. 3e and 3f. Signal EN1 controls the enable input of the EPROM (erasable programmable read only memory) which converts the 8 bit wide useful data into 10 bit wide channel data. Signal EN2 is the enable signal for the function group ATF selection which carries out the modification of the code word in dependence on the track.

Figure 4B:
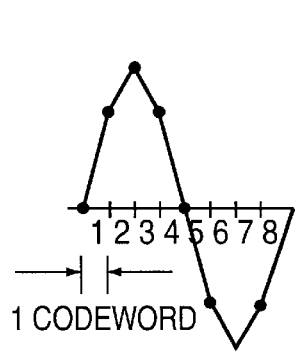
FIG. 4a and 4b respectively show the waveforms of the code words which produce a triangular signal and a signal approximating to a sine curve.
Figure 4A:
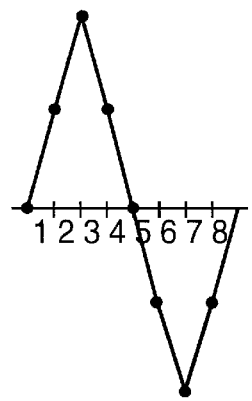

FIG. 4a illustrates the waveform produced by code words for a frequency of clock-rate/80=8×10 bit words. A triangular signal results by using code words of 4 bits each. There are two consecutive +4 bit words followed by four consecutive −4 bit words and then two more +4 bit words. The more nearly sinusodial waveform shown in FIG. 4b is produced using the sequence of +/−2 and 4 bit words shown at the bottom of the figure.

Figure 5:
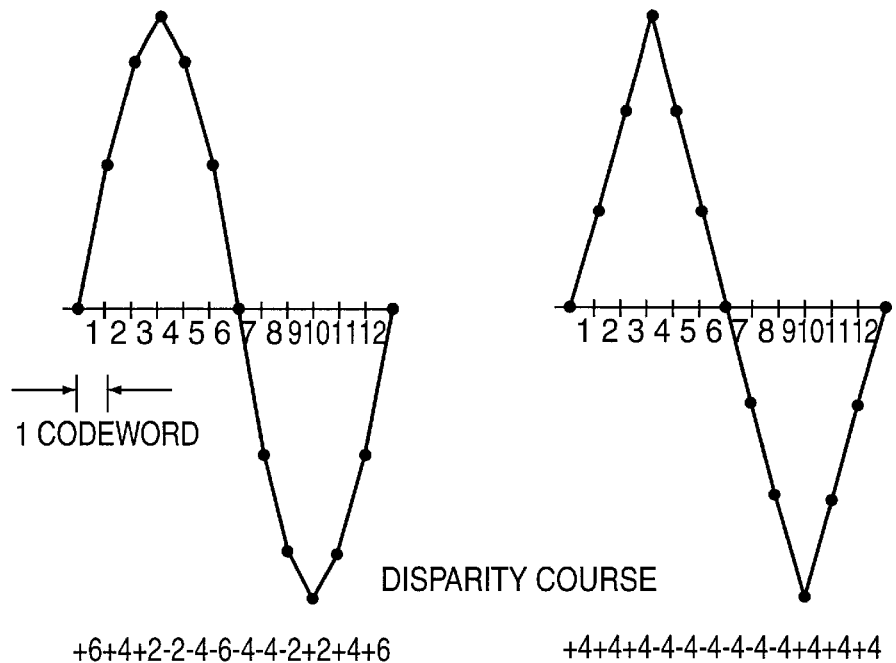
FIGS. 5 and 6 show waveforms of the type shown in FIGS. 4a and 4b for different ATF frequencies.

FIG. 5 shows examples for a clock-rate/120 using the code words shown at the bottom of the FIGURE and which yield waveforms having distinctly higher amplitude values.

Figure 6:
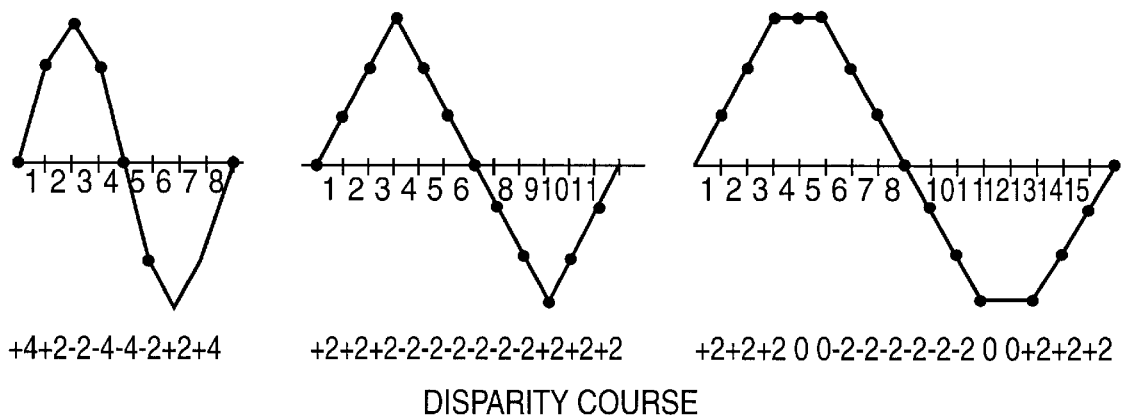
Figure 7:
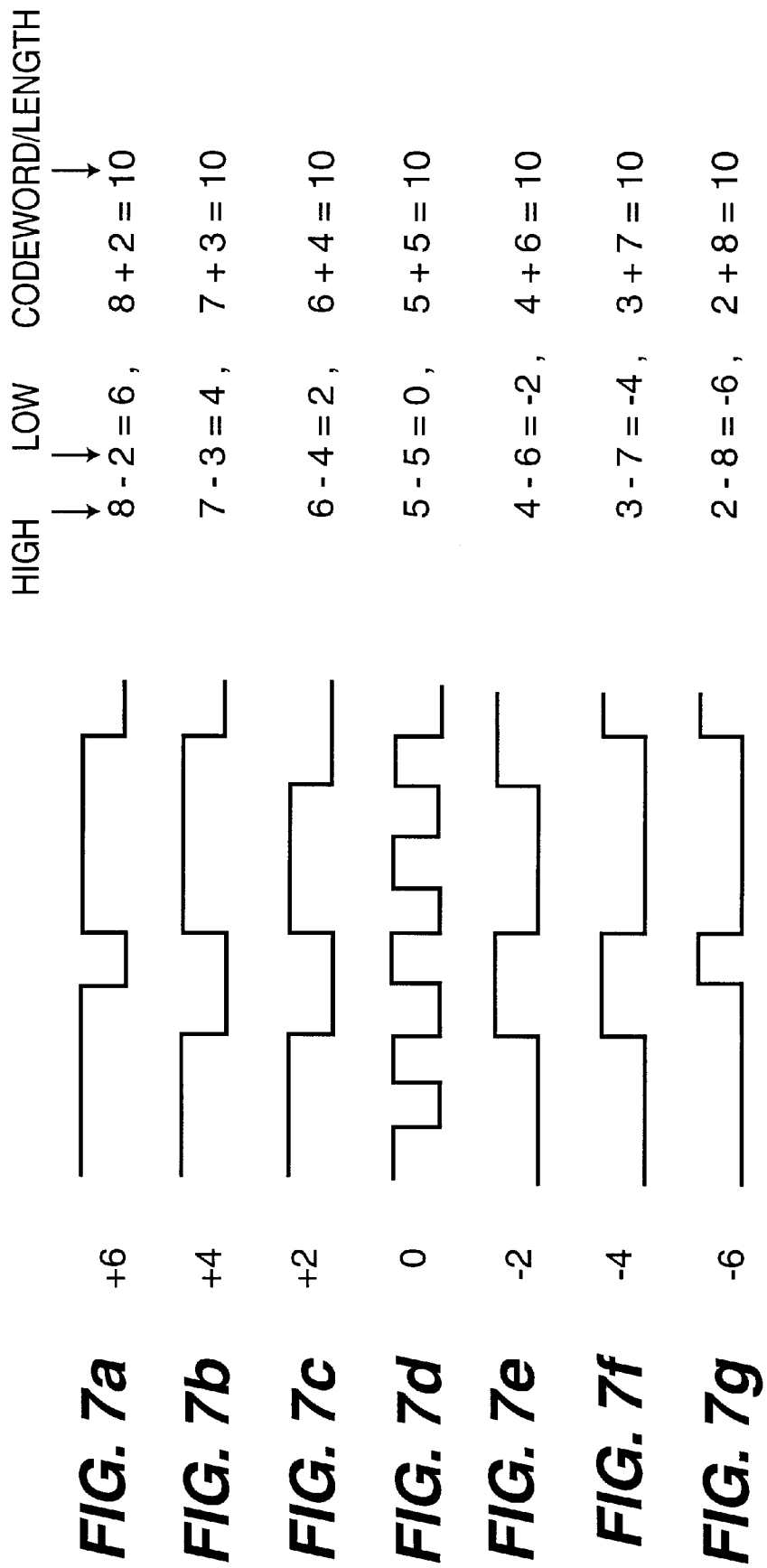
FIGS. 7a to 7g show the signal profiles of the code words for various voltage values.

FIG. 6 shows the constant amplitude ratios of waveforms using different frequencies and code words shown at the bottom of the FIGURE to obtain different upper harmonic content of the individual signals.

The signal waveforms of several code words are illustrated in FIGS. 7a to 7g. These figures depict 8/10 modulation for a clock frequency of 50 MHz, a length limitation of 6 consecutive bits having the same + or − sign and three different ATF frequencies, as follows:

ck=50 MHz f1=ck/80=625 kHz=12 oscillations/Block, Period=8•10 Bit f2=ck/120=416 kHz=8 oscillations/Block, Period=12•10 Bit f3=ck/160=312.5 kHz=6 oscillations/Block, Period=16•10 Bit f0=DC-free The codeword criteria is a disparity of +/−6, +/−4, +/−2, 0 and a maximum run length ($T_{max}$) of 6. The various code words which represent the selected voltage levels are produced by using different sequences of high and low bits. For example, in FIG. 7a a voltage level of 6 is produced by sending 8 high and 2 low bits in the sequence 4 H, 1 L, 4 H, and 1 L. As can be seen from FIG. 7 all levels are produced using the same frequency and number of bits, only the number of H and L bits is changed.

Figure 8:
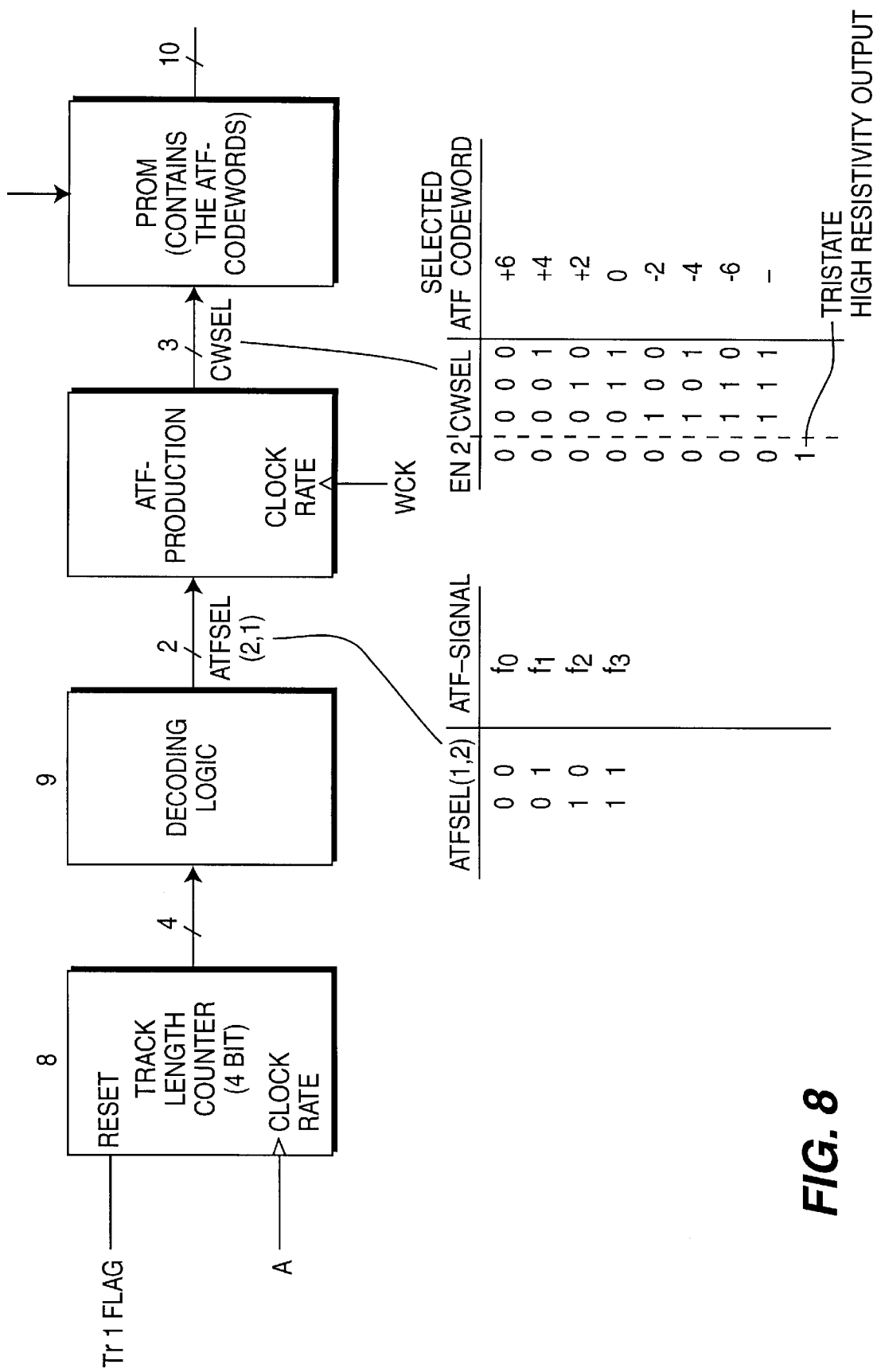
FIG. 8 is a preferred embodiment the ATF system.

FIG. 8 shows one possibility for realizing the block "ATF selection". The various tracks of a full frame can be marked with the aid of the track length counter 8 (incrementation once per track by means of A, resetting of the counter during the first track of a full frame by means of TR1Flag). A decoding logic 9 allocates the appertaining ATF frequency to each track. For each ATF frequency, the ATF production generates a sequence of addresses which, in their turn, select the appertaining ATF code words from a PROM.

Figure 9:
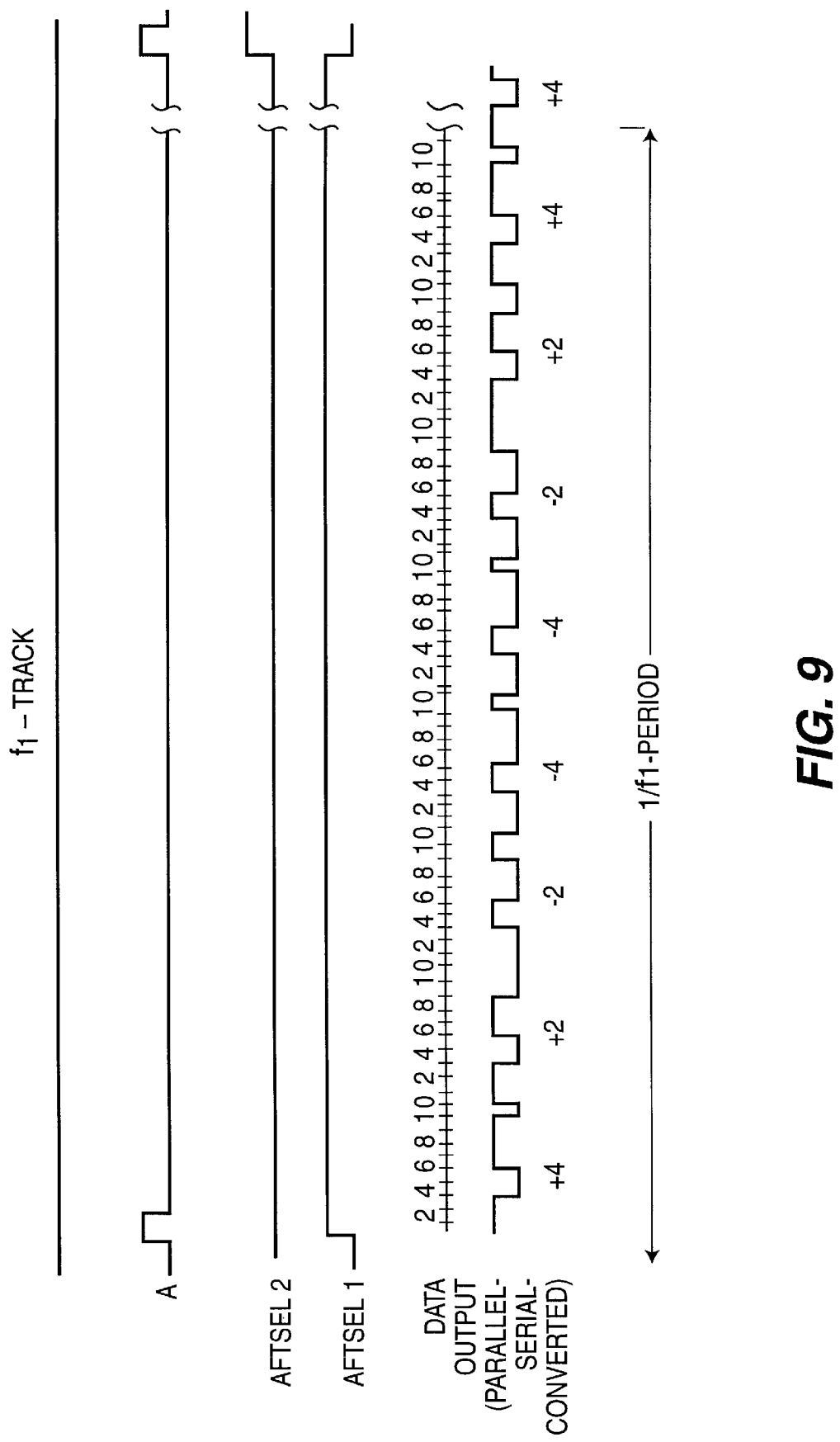
FIG. 9 shows an example of the sequence of code words.

FIG. 9 shows in exemplary fashion, the sequence of code words which are selected in order to generate the ATF frequency f1=ck/80. The ATF production can be realized by a PROM and the corresponding state stores or alternatively by programmable logic devices (PLD's). Thereby, in dependence on ATFSEL (1, 2), a certain sequence of states is run-through whereby, for each state, a specific address is emitted which once more selects the corresponding ATF code word, see also FIGS. 7, 4, 5.

Figure 10A:
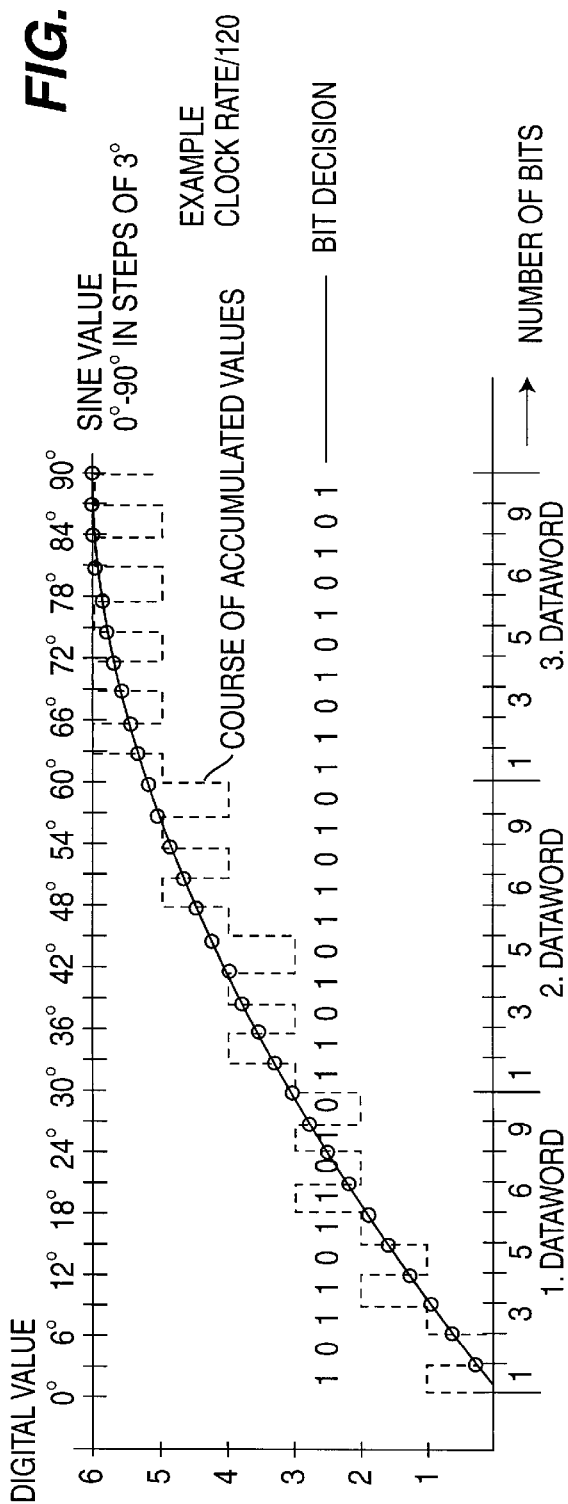
FIG. 10a and 10b show optimized sinusoidal ATF signals produced using 2.25° and 3.0° steps.
Figure 10B:
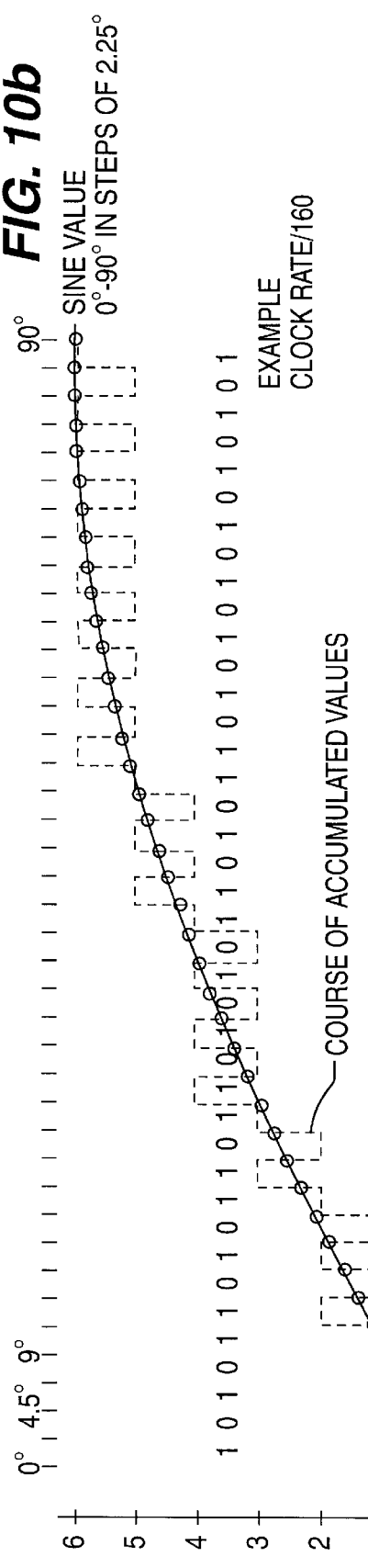

The production of a optimized sinusoidal ATF signals can be effected using a series of code words as shown in FIGS. 10a and 10b. Digital code words, which closely approximate sinusodial waveforms are obtained from a table. Each bit of the code words results in one interval of the sine wave and each is either positive or negative. The illustrations are restricted to the range 0–90° and represent the approximation of sine waves for clock-rates of 120 pps and 160 pps. The maximum amplitude is limited to +/−6 but, may be increased considerably depending upon the permitted run length. In FIG. 10a, the frequency is lower and each bit is a 3° increment of the sinusodial waveform. Accordingly only the three code words shown in the FIGURE are needed to complete the 90° portion. In FIG. 10b, the increased frequency results in 2.25° increments and the four code words shown in the FIGURE are needed. Although the approximation may sometimes be coarse, very good harmonic distortion factors for the generated sinusoidal signal are obtained The illustration was initially foreseen for a 10 bit raster and thereby provides one simple method for the dimensioning of the values in the table. In practice, it has proved advantageous to carry out a comparison operation in the bit domain.

Figure 11:
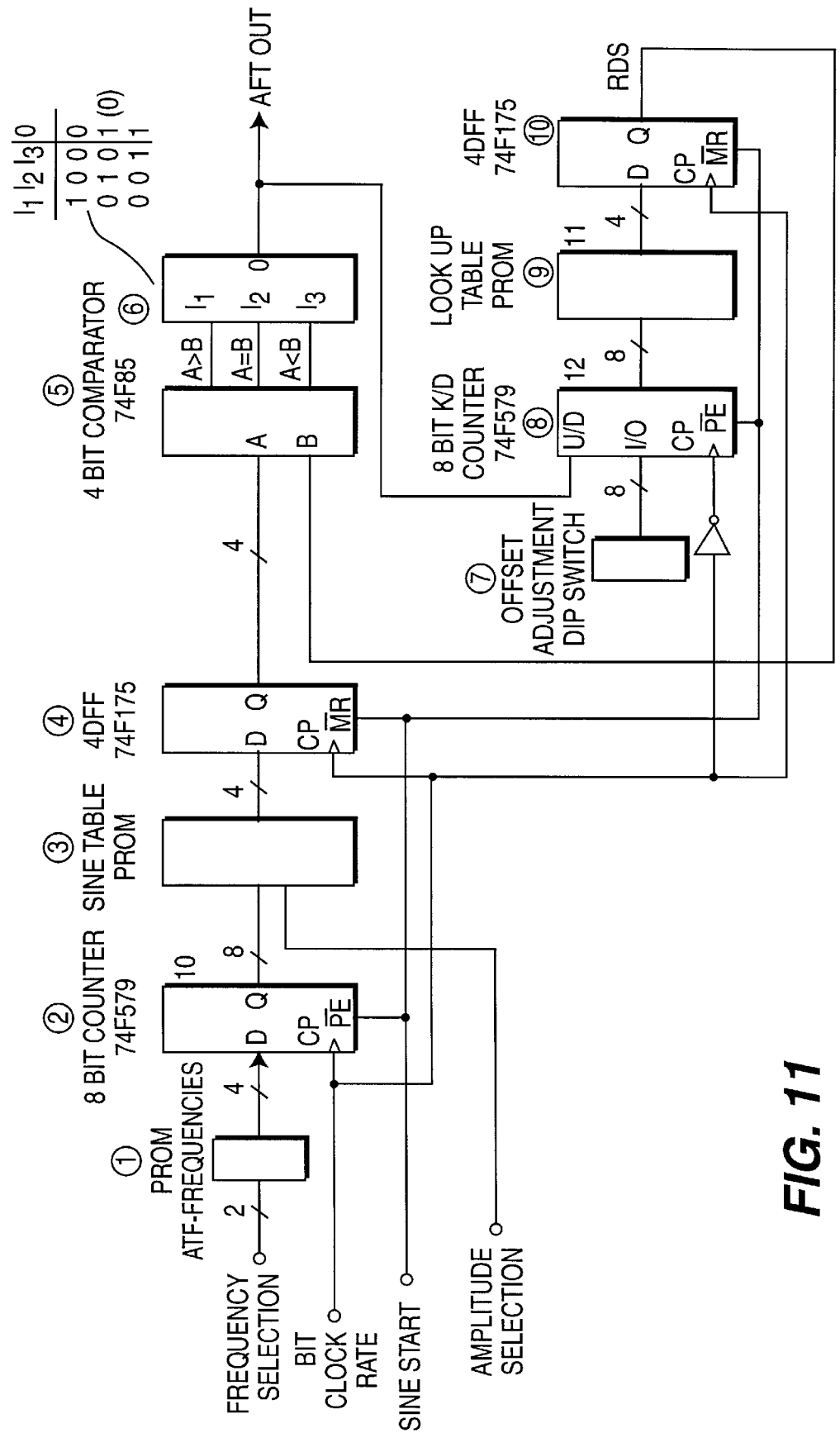
FIG. 11 shows a circuit which can be used for the control loop.

Since this method can be used in a control loop, it is to be rated as of utmost importance for the implementation at the chip level. A circuit of such a control loop is shown in FIG. 11. In FIG. 11, PROM-ATF frequencies, means: selection of the counter value for the counter 10 which is necessary for the current ATF frequency with the aid of the signal "frequency selection". PROM-sine table, means: This contains the 4 bit sine values in complementary binary form.

The module 9 contains a PROM look-up table. In this circuit there occurs the conversion of the counter position of the counter 12 characterising the current code word, or digital sum (RDS) into an offset-free value in complementary binary form.

The production of ATF signals is not limited to 8/10 modulation but may also be applied to any sort of block code. Furthermore, the approximation to a sinusoidal wave may also be advantageously built up with code words of odd number sums whereby the edges of the blocks then become blurred and the sinusoidal wave is produced by a sequence of e.g. 120 bits and an equal sized number of code words exist which are longer or shorter than the average of all the code words. The arrangement of the bit codes (e.g. 10 bit wide output words) would then have to be departed from for this, which could make the implementation more difficult.

We claim:

1. A method of controlling track following in a recorder which uses recording in oblique tracks of a magnetic tape wherein data gaps occur in between useful data, comprising the steps of:

filling said data gaps with at least three code words, each having a predetermined sequence of cyclical modifications, different from one another, forming a digital sum, the variation of said digital sum being represented by one of amplitude and degree of a train of continuous oscillations;

an even number of said code words corresponding to a complete and continuous symmetrical cycle of said tracking signal with respect to said digital sum;

generating said code words in synchronism with a clock rate at which said useful data is clocked;

said code words representing amplitude increments so that said complete and continuous symmetrical cycles of said tracking signal which are located in ones of said data gaps having different durations produce waveforms having the same peak-to-peak amplitude;

the variation of the digital sum of said code words of at least one of said complete and continuous symmetrical cycles of that tracking signal corresponding in amplitude to a sinusoidal waveform; and said digital sum corresponding to a disparity of said code words.

2. The method of claim 1 wherein said data gaps are formed by one of run-in, run-out and edit gaps.

3. The method of claim 1 further including the steps of modulating said useful data and turning off said modulation during each of said data gaps.

4. The method of claim 1 further including the step of using a block synchronizing signal to identify said data gaps and wherein the length of said code words is at least an order of magnitude smaller than that of said block synchronization signal.

5. The method of claim 1 wherein each of said code words is represented by a respective pulse signal in which each pulse corresponds to a bit of said code word, at least two pulses of a pulse signal having the same sense.

* * * * *